United States Patent
Ebner et al.

(10) Patent No.: US 6,872,451 B2
(45) Date of Patent: Mar. 29, 2005

(54) IONOMERIC OXYGEN SCAVENGER COMPOSITIONS

(75) Inventors: Cynthia L. Ebner, Greer, SC (US); Arthur L. Berrier, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 10/649,739

(22) Filed: Aug. 28, 2003

(65) Prior Publication Data

US 2005/0048286 A1 Mar. 3, 2005

(51) Int. Cl.[7] .......................... B32B 9/06; B32B 15/08; B32B 27/08; C08K 3/10; C08K 5/56
(52) U.S. Cl. ................ 428/411.1; 428/457; 428/537.5; 252/188.28; 524/176; 524/398; 524/413
(58) Field of Search .................. 428/457, 537.5, 428/411.1; 523/515; 252/188.28; 524/176, 398, 413, 431, 435, 502, 513, 514, 539, 589, 599, 601, 604, 605, 609

(56) References Cited

U.S. PATENT DOCUMENTS

| | | | |
|---|---|---|---|
| 4,536,409 A | 8/1985 | Farrell et al. | 426/398 |
| 4,702,966 A | 10/1987 | Farrell et al. | 428/500 |
| 5,021,515 A | 6/1991 | Cochran et al. | 525/371 |
| 5,166,309 A | 11/1992 | Maj et al. | 528/272 |
| 5,211,875 A | 5/1993 | Speer et al. | 252/188.28 |
| 5,281,360 A | 1/1994 | Hong et al. | 252/188.28 |
| 5,399,289 A | 3/1995 | Speer et al. | 252/188.28 |
| 5,604,043 A | 2/1997 | Ahlgren | 428/518 |
| 5,700,554 A | 12/1997 | Speer et al. | 428/220 |
| 5,859,145 A | 1/1999 | Ching et al. | 525/330.6 |
| 6,083,585 A | 7/2000 | Cahill et al. | 428/35.7 |
| 6,254,803 B1 | 7/2001 | Matthews et al. | 252/188.28 |
| 6,254,804 B1 | 7/2001 | Matthews et al. | 252/188.28 |
| 6,346,308 B1 | 2/2002 | Cahill et al. | 428/35.7 |
| 6,365,247 B1 | 4/2002 | Cahill et al. | 428/35.7 |
| 6,544,611 B2 | 4/2003 | Schiraldi et al. | 428/35.8 |

FOREIGN PATENT DOCUMENTS

| | | |
|---|---|---|
| AU | 199656326 | 12/1996 |
| DE | 1900181 | 10/1969 |
| WO | 99/48963 | 9/1999 |

*Primary Examiner*—Ramsey Zacharia
(74) *Attorney, Agent, or Firm*—Howard Troffkin; Mark Quatt

(57) ABSTRACT

A film, laminated product, and other packaging materials are disclosed, each including an oxygen scavenger composition including mer units derived from a substituted alicyclic compound having non-aromatic, ethylenic functionality, mer units including an ionomeric group, and mer units of a di- or polyfunctional hydrocarbon compound. Certain oxygen scavenger compositions have been found to act as an oxygen scavenger under both ambient and refrigeration conditions, to be compatible with conventional film forming packaging materials, to inhibit undesirable oligomer formation and oxidation by-product formation, and to be readily formable and processable using conventional film forming equipment.

22 Claims, No Drawings

IONOMERIC OXYGEN SCAVENGER COMPOSITIONS

FIELD OF THE INVENTION

The invention relates to a an oxygen scavenger composition and packaging material.

BACKGROUND OF THE INVENTION

Limiting the exposure of oxygen-sensitive materials, e.g. food products, meats, beverages, pharmaceuticals, etc., to oxygen exposure provides a means to maintain and enhance the quality and shelf life of the packaged product. For example, packaging a food product in a package capable of minimizing oxygen exposure is a means to maintain the quality of the packaged product over an extended time and to retard spoilage of the product so that the product is maintained in inventory longer without wastage and the need for restocking and replacement.

When a container is formed of a metal or glass body and is provided with a hermetically sealed closure, the permeation of oxygen through the body and the closure is theoretically impossible because of the impermeability of the materials from which the body and closure are formed. Metal cans may reliably prevent oxygen ingress. However, in both instances some oxygen ingress may occur by diffusion through the gasket or the like positioned between the container body and its lid. When a container is formed of a plastic material, such as a bottle, plastic bag, film, tray or lid, the permeation of oxygen through the body becomes an issue of importance. Further, the quality of the packaged material tends to deteriorate over time, in part because of dissolved oxygen typically present in the packaged material at the time it is placed in the packaging container and also in part due to oxygen ingress which occurs during storage. It has long been recognized that when conventional containers of these types are used for the storage of oxygen sensitive materials, the shelf life of the stored materials is limited.

In the food packaging industry, several techniques have been developed to limit oxygen-sensitive packaged materials to oxygen exposure. Such techniques include the use of a barrier material or layer (a material or layer having low permeability to oxygen) as part of the packaging; the inclusion of some means capable of consuming oxygen other than the packaging material (e.g. through the use of sachets and the like having material capable of reacting with oxygen); and the creation of a reduced oxygen environment within the package (e.g. modified atmosphere packaging (MAP) and vacuum packaging).

Although each of the above techniques has its place in the industry, it is well recognized that the inclusion of an oxygen scavenger as part of a packaging article is one of the most desirable means of limiting oxygen exposure.

It is known to include an oxygen scavenger in a sheet material. The oxygen scavenger reacts with oxygen that is trapped in the package or that permeates into the package. For instance, this is described in U.S. Pat. Nos. 4,536,409 and 4,702,966 and the prior art discussed in these references. The inclusion of oxygen scavengers within the cavity of the package is a form of "active packaging", i.e., the modification of the package to accommodate a means to regulate oxygen exposure. Normally, the modification is in the form of a sachet or the like introduced into the package cavity. Such active packaging devices have the disadvantages of requiring additional packaging operations, potential breakage of the sachet causing contamination of the packaged goods, and uneven or localized scavenging.

Alternately, regulating the exposure to oxygen involves incorporation of an oxygen-scavenging agent directly into the packaging structure itself. For example, oxygen-scavenging agents have been utilized as part of the package element (film, gasket, coating, etc.) rather than by the addition of a separate structure to the package. Such application has been found to provide a more uniform scavenging effect throughout the package and to provide a means of intercepting and scavenging oxygen as it passes through the walls of the package (herein after referred to as "active barrier" application). Incorporation of a scavenger agent are also used to consume oxygen contained in the packaging article either as residual air oxygen in the packaged goods and/or in the void space within the packaging article not occupied by the packaged goods (herein after referred to as "headspace oxygen scavenging" applications). Headspace oxygen scavenging normally entails the removal of large quantities of oxygen from the interior of the package.

Various agents have been proposed as oxygen scavengers. For example, Michael Rooney, in his article "Oxygen Scavenging: A Novel Use of Rubber Photo-Oxidation", Chemistry and Industry, Mar. 20, 1982, Pg. 197–198, describes the use of ethylenically unsaturated compounds as oxygen scavengers when exposed to light.

Attempts to produce active oxygen scavenging barrier products include the incorporation of inorganic powders and/or salts into a polymer matrix used to form packaging. Incorporation of such powders and/or salts has been found to cause degradation of the transparency and mechanical properties (e.g. tear strength) of the packaging material and cause processing difficulties in the fabrication of the packaging material.

Attempts have been made to produce active oxygen scavenging barrier products in which a polyamide-metal catalyst system capable of scavenging oxygen is incorporated into a polymeric packaging material. This polyamide based system has the disadvantages of incompatibility with thermoplastic polymers normally used in forming flexible packaging materials, reduced flexibility and heat sealability of the resultant packaging material, and degradation of the polymer's physical properties and structure upon reaction with oxygen.

U.S. Pat. No. 5,399,289, incorporated herein by reference in its entirety, teaches the use of ethylenically unsaturated hydrocarbon polymers (e.g. polybutadiene and like), and copolymers and polymer blends thereof formed by free radical polymerization. This reference teaches that the unsaturation should be limited to 0.01 to 10 equivalents per 100 grams of polymer as the adsorption of oxygen by such systems causes fission of the polymer backbone chain. Such polymers, when reacting with oxygen, normally degrade to low molecular weight products via chain scission and the resultant oxidation by-products can cause degradation of the taste, color and odor of the packaged material (e.g. food products). Further, because these polymers are amorphous, packaging compositions formed with conventional semi-crystalline polymer matrixes are difficult to be blended and processed.

While the prior art compounds may effectively scavenge oxygen, they introduce other problems into packaging. For instance, in summary, the prior art teaches the incorporation of compounds which are ethylenically unsaturated but which often cleave as a consequence of the reactions of the oxygen scavenging process. For example, films containing unsaturated compounds, such as squalene or vegetable oils, produce large amounts of volatile aldehydes and ketones upon oxidation. Unfortunately many of the resultant volatile compounds are not maintained within the film structure and find their way into the headspace of the package. Here they have the potential to degrade the taste, color and/or odor of comestible products.

U.S. Pat. No. 6,254,803 discloses polymers having at least one cyclohexenyl group or functionality as being useful as oxygen scavengers. This reference includes the use of condensation polymers formed from tetrahydrophthalic anhydride, the free acid, and the ester or diester derivatives with a diol or polyol reagent. For example, when the cyclohexenyl containing reactant is a free acid, an anhydride or ester group, the reference teaches that diols, e.g. butanediol, may be used as a co-reactant. Alternatively, the condensation polymer may be formed from a tetrahydrobenzyl alcohol or the corresponding amine or other cyclohexenyl amine which is reacted with compounds having a plurality of functional groups selected from carboxylic acid, acid halide, acid anhydride, isocyano or mixtures thereof. The teachings of U.S. Pat. No. 6,254,803 are incorporated herein in its entirety by reference.

Although polymers formed from tetrahydrophthalic anhydride and the like according to U.S. Pat. No. 6,254,803 do not generate large amounts of oxidation fission products during scavenging, they have limited application where a low $T_g$ is necessary (e.g. applications directed to refrigerated headspace oxygen scavenging). For applications that are directed to refrigerated headspace oxygen scavenging, a low $T_g$ is necessary. However, when this requirement is met, the referenced polymers, in addition to having low $T_g$, exhibit low melting point, high melt flow index, high tack properties and are viscous liquids at ambient temperature conditions. Such polymers are not pelletizable or readily handled, and are difficult to process into films and other packaging articles using conventional processing equipment. They can provide a resultant product that may not be acceptable for packaging applications.

Ideally, a polymeric material useful in an oxygen scavenging composition should exhibit good processing characteristics, be able to be formed into useful packaging materials, have high compatibility with those polymers commonly used to make packaging materials, and not contain or produce by-products which detract from the color, taste, or odor of the packaged product. Further, the resultant oxygen scavenging composition should be active both under ambient and refrigerated temperature conditions for either headspace oxygen scavenging applications or "active barrier" scavenging applications.

The present invention seeks to address the problems associated with the polymers produced according to U.S. Pat. No. 6,254,803, by seeking to provide compositions that 1) act as oxygen scavengers in packaging applications while minimizing the migration of low molecular weight products out of the packaging material containing the compositions and into packaged goods, and/or 2) can be used under both ambient and refrigerated conditions, and/or 3) can be used for refrigerated headspace scavenging applications, and/or 4) when reacted with oxygen, produce very low quantities of scission and oligomeric by-products, and/or 5) can be readily processed using conventional film forming equipment (e.g. extrusion equipment) or coating equipment to provide a film substantially free of defects, and which can be readily handled to provide a finished packaged article.

It has been found that when condensation polymers comprising ethylenic unsaturation as part of a cyclic group further comprises pendent internal or terminal ionomeric groups as fully described herein below, one can achieve an oxygen scavenger composition having the desired combination of properties indicated above.

SUMMARY OF THE INVENTION

The present invention is in one aspect directed to an oxygen scavenger composition having at least one cycloalkenyl group or functionality and, further, having at least one ionomeric group or functionality as part of the polymer product. The present oxygen scavenger composition has been found to act as an oxygen scavenger agent, to be compatible with conventional film forming packaging materials, and to provide compositions exhibiting low tack which can be readily formed and processed using conventional film forming equipment.

Specifically, the present invention is directed to a film or laminated product suitable for packaging applications composed of at least one layer when in the form of a film or a plurality of layers when in the form of a laminated product, wherein at least one layer of said film or laminated product comprises a condensation polymeric composition having cycloalkenyl group(s) or functionality and ionomeric group (s) or functionality, as fully described herein below.

The present invention, alternately, is directed to a film or laminated product suitable for packaging applications having at least one layer when in the form of a film or a plurality of layers when in the form of a laminated product wherein at least one layer of the film or laminated product is composed of a polymeric composition comprising a diluent polymer having substantially uniformly distributed therein an oxygen scavenging condensation polymer having cycloalkenyl group(s) or functionality and ionomeric group (s) or functionality, as fully described herein below

DETAILED DESCRIPTION OF THE INVENTION

The present invention can be used in packaging articles having various forms. Suitable articles include, but are not limited to, flexible sheet films, flexible bags, rigid containers or combinations thereof. Typical flexible films and bags include those used to package various food items and may be made up of one or a multiplicity of layers to form the overall film or bag-like packaging material. The oxygen scavenger polymer product and composition of the present invention can be used in one, some or all of the layers of such packaging material.

Material in the form of flexible films and bags normally have thickness ranging from about 5 to 260 micrometers. Typical rigid or semi-rigid articles include plastic, paper or cardboard containers, such as those utilized for juices, soft drinks, as well as thermoformed trays or cups normally have wall thickness in the range of from 100 to 1000 micrometers. The polymeric oxygen scavenger of the present invention can be used as an integral layer or as a coating of the formed packaging article.

Although it may be preferable from the standpoint of packaging convenience and/or scavenging effectiveness to employ the present invention as an integral part of the packaging wall, the invention can also be used as a non-integral component of this packaging article such as, for example, bottle cap liner, adhesive or not-adhesive sheet insert, sealants, sachet, fibrous mat insert and the like.

Besides packaging articles applicable for food and beverage, packaging for articles for other oxygen-sensitive products can also benefit from the present invention. Such products would include pharmaceuticals, oxygen sensitive medical products, corrodible metals or products, electronic devices and the like.

Although it has been previously reported (See U.S. Pat. No. 6,254,803) that materials containing certain cyclohexenyl functionalities are good oxygen absorbers when compounded with a transition metal salt and, optionally, a photoinitiator, the use of such materials, especially polymeric materials containing said cyclohexenyl functionality, when prepared as necessary for refrigerated oxygen scavenging conditions, has been limited due to the fact that they exhibit low Tg, low melting point, high melt flow index and high tack properties and are viscous liquids at ambient temperature conditions. These properties cause difficulties in conventional processing techniques (e.g. extrustion of films and the like) and handling of the finished product.

It has now been found that polymers having a combination of cycloalkenyl functionalities and ionomeric functionalities provide an improved composition which maintains a low Tg, yet is a non-tacky solid substance at ambient temperature conditions. The present polymers are capable of being readily processed by conventional techniques. Further, the resultant materials have good handling properties and are capable of effectively scavenging oxygen under ambient and refrigeration (e.g. +10 to minus 20° C., such as from +6 to minus 15° C., +5 to minus 10° C. and +5 to minus 5° C.) conditions.

The following terms shall have the following meaning when used in the present specification and appended claims unless a contrary intention is expressly indicated:

"aromatic" shall refer to organic molecules and groups having at least one six carbon ring of the benzene and related series or the condensed six carbon rings of naphthalene and related series; said groups may be referred to as aryl, alkaryl or aralkyl groups and the like.

"condensation polymer" shall mean a polymerization product formed by the union of like or unlike molecules which are covalently bonded by a reaction of groups on each molecule with the elimination of water, acid, alcohol or the like, such as the reaction of a hydroxyl group with a carboxylic acid group, an amine group with a carboxylic acid group, a carboxylic acid anhydride group with a hydroxyl group and the like.

"functional group" shall mean ester, alcohol, carboxylic acid, halogen, primary, secondary, or tertiary amine, aldehyde, ketone, hydroxyl or sulfonyl group.

"film" shall mean an article suitable for packaging application or suitable for forming an article useful for packaging application wherein the article comprises a flexible article having extended length and width demensions and a thickness of from about 5 to 260 micrometers composed of at least one layer wherein at least one layer is composed of the ionomeric condensation polymer oxygen scavenging composition of the present invention.

"film forming polymer" shall refer to polymers known by those skilled in the art to be capable of forming a flexible, translucent or transparent product having length and width demensions that are at least 1000 times that of the thickness dimension of said product. A polymer capable of forming a membrane-like product.

"hydrocarbyl" shall mean a univalent or divalent organic group composed of hydrogen and carbon, preferably containing 1 to 40 carbon atoms.

"laminated product" shall mean an article suitable for packaging application or suitable for forming an article useful for packaging application wherein the article comprises a plurality of layers having at least one layer composed of the polymeric oxygen scavenging composition of the present invention and having at least one additional layer composed of a flexible, semi-rigid or rigid material, such as, for example, a polymeric film, a polymeric structure, a paper film or structure, a cardboard film or structure, a metal film or structure or the like.

"packaging material" shall generically refer to a flexible film, laminated product and non-integral component suitable for use as part of a packaging article.

"polyester" shall mean a polymerization product having two or more distinct monomeric units which are covalently bonded by the reaction of a hydroxyl group of one unit with a carboxyl group (free carboxylic acid, the anhydride or a hydrocarbyl ester) of another unit.

"polymer" shall mean a polymerization product composed of a multiplicity of monomeric units (also referred to as "mer units"). The polymer may be a homopolymer composed of a plurality of like monomeric units or a copolymer composed of a plurality of two or more distinct monomeric units.

The oxygen scavenger polymer of the present invention comprises a condensation polymer having mer units derived from the condensation reaction of:

(A) at least one or a mixture of substituted alicyclic compounds having non-aromatic, ethylenic functionality according to the following representation:

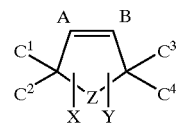

wherein

A, B, $C^1$, $C^2$, $C^3$, $C^4$ each independently represents hydrogen or a $C_qH_{2q+1}$ hydrocarbyl group with q being an integer in the range of from 0 to 20, provided that either A or B and at least one of $C^1$, $C^2$, $C^3$, $C^4$ are hydrogen atoms and each carbon atom of the alicyclic ring is fully substituted by hydrogen, hydrocarbyl, X and/or Y group(s)or mixtures thereof to fill its valence state;

X and Y each independently or together represents functional groups that are capable of being part of a heteroatom containing linkage forming a covalent bond linkage between the cycloalkenyl group and other monomeric groups forming the condensation polymer. For example, the functional group (preferably both being the same functional group or an anhydride group) can be selected from —($CH_2$)$_n$—OH, —($CH_2$)$_n$—$NH_2$, —($CH_2$)$_n$—N=C=O and —($CH_2$)$_n$—C=O)-D with n being an integer in the range from 0 to 20 and D being selected from a halide atom or an OR group, wherein R is an —H, or $C_1$–$C_{12}$ alkyl group, or X and Y together represent —($CH_2$)$_n$—C=O)$_x$-D with n being an integer in the range from 0 to 20 and D is oxygen atom with x being 2; and Z representing a —($C_tH_{2t}$)— hydrocarbylene group with t being an integer in the range from 1–4.

(A) at least one or a mixture of substituted non-aromatic or aromatic hydrocarbon compound having ionomeric functionality according to the following representation:

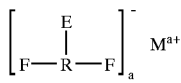

wherein
R represents a non-aromatic or aromatic hydrocarbon group,
each F independently, or two F together, represents a functional group capable of being part of a heteroatom containing linkage between the hydrocarbon group R and other monomeric groups forming the condensation polymer, said F group being selected from functional groups as described above with respect to X and Y;
E represents an anionic group selected from sulfonyl or carboxyl group;
M represents a cationic alkali metal ion or cationic alkaline earth metal ion; and
"a" represents an integer having the value equal to the numerical value of the valence of M.

(C) at least one or a mixture of di- or polyfunctional hydrocarbon compounds according to the following representation:

G-R'(-G)$_x$ wherein
R' represents a non-aromatic or aromatic hydrocarbon group selected from alkyl, cycloalkyl, aryl, alkaryl or aralkyl group, any of which may contain heteroatoms which are substantially inert with respect to the condensation polymerization and the oxygen scavenging;
G represents a functional group capable of being part of a heteroatom containing linkage between the hydrocarbyl group and other monomeric groups forming the condensation polymer, said G group being selected from functional groups as described above with respect to X and Y; and
x represents an integer of at least 1 to provide for a plurality of G groups as part of the monomer(C). It is preferred that x represent an integer of from 1 to 5, more preferably from 1 to 3.

Examples of monomer (A) may include but are not limited to 1,2,3,6-tetrahydrophthalic acid; cis-1,2,3,6-tetrahydrophthalic anhydride; dimethyl-cis-1,2,3,6-tetrahydrophthalate; 3-cyclohexene-1,1-dimethanol; 3,4,5,6-tetrahydrophthalic anhydride; 4-cyclohexene-1,2-diacetic acid; 3-cyclohexene-1,2-diacetic acid; 1-cyclohexene-1,4-dimethanol; 1-cyclohexene-1,2-dimethanol; 3-methyl-4-cyclohexene-1,2-diacetic acid; 1,2,3,6-tetrahydrophthalic acid, dimethyl ester; cis-dimethyl-3-cyclohexene-1,2-diacetate; 3-cyclohexene-1,1-dimethanol; 4-cyclopentene-1,3-diol, cyclohexene-4,5 dimethanol; 1-cyclopentene-1,2-dicarboxylic anhydride; a tetrahydrophthalic anhydride derived from a butadiene, 2,3-dimethyl-1,3-butadiene or isoprene; a cyclohexenyl diamine; and the like.

Examples of monomer (B) may include but are not limited to 5-sulfoisophthalic acid, sodium salt; dimethyl-5-sulfoisophthalate, sodium salt; 5-sulfoisophthalic acid, lithium salt; dimethyl-5-sulfoisophthalate, lithium salt; 5-sulfoisophthalic acid zinc salt; dimethyl-5-sulfoisophthalate, zinc salt; and other metal salts of these materials, such as potassium, magnesium, calcium, or cobalt; 4-sulfophthalic acid and salts; dimethyl-4-sulfophthalate and salts; 3-sulfophthalic acid and salts; dimethyl-3-sulfophthalate and salts; 4-sulfo-1,8-naphthalic anhydride, potassium salt; sulfosuccinic acid and salts; dimethyl-sulfosuccinate and salts; dioctylsulfosuccinate and salts; 1,3-dimethyl 5-(3-sulfopropoxy)-1,3-benzenedicarboxylate sodium salt; 1,3-benzenedicarboxylic acid, 5-sulfo-, 1,3-bis(2-hydroxyethyl) ester; 1-(2-hydroxyethyl) 3-methyl 5-sulfo-1,3-benzenedicarboxylate monosodium salt; 3-hydroxy-2-(hydroxymethyl)-propanoic acid; and salts; 3-hydroxy-2-(hydroxymethyl)-2-ethyl-propanoic acid and salts; 3-hydroxy-2-(hydroxymethyl)-propanoic acid and salts.

The ionomeric functionality can be imparted by monomer (B) having at least one alkali metal (such as sodium or lithium) or an alkaline earth metal (such as calcium or magnesium) salt of a sulfonic acid group or a carboxylic acid group. When the alkaline earth metal is present, the monomer (B) may be a dimer of monomer (B) which is ionically bonded through the metal atom. Alternately, when an alkaline earth metal is present in the polymer and the monomer (B) is used as the free acid when forming the condensation polymer and subsequently subjected to metal base to form the ionomeric functionality, the metal can be associated to anionic acid groups of two polymer chains or to two anionic acid groups of a single polymer chain.

The monomer (C) used to form the present oxygen scavenger polymeric material is a di- or polyfunctional (via group G) hydrocarbon compound. At least one or mixtures of materials may be used.

The R' group may have G functional groups bonded to the R' group at any position of the R' group. For example, each G functional group may be terminally bonded to the R' group or may be bonded to an internal carbon atom of the R' group. Further, there may be two G functional groups (preferred) or a plurality of greater than two of said groups as, for example three or four of said functional groups bonded to an R' group.

Examples of monomer (C) include but are not limited to:
1) alicyclic or aliphatic diols such as $C_2$–$C_{20}$ alkanediols as, for example, ethylene glycol, propanediol, butanediol (all isomers), pentanediol (all isomers), hexanediol (all isomers) such as 1,6-hexanediol, heptanediol, octanediol such as 1,8-octanediol, 1,10-decanediol, 1,14-tetradecanediol, 1,4-cyclohexanediol, 1,4-cyclohexanedimethanol, polyethylene glycol and the like;
2) aromatic diols as, for example 1,3-benzenediol, 1,3-naphthanediol and the like;
3) polyols as, for example, 1,2,3-propanetriol, 1,3,5-pentanetriol, 1,5,8-heptanetriol, trimethyolpropane, neopentyl glycol and the like;
4) diamines such as propylenediamine, butylenediamine, hexylenediamine and the like;
5) isocyanates, such as toluenediisocyanate, hexamethylene diisocyanate and the like;
6) aliphatic or aromatic carboxylic acids or anhydrides, such as trimellitic anhydride, pyromellitic dianhydride, benzophenone tetracarboxylic dianhydride, isophthalic acid, dimethyl isophthalate, terephthalic acid, dimethyl terephthalate, adipic acid, succinic acid and the like, or
7) mixtures of the above materials.

The term "hydrocarbon" moiety or group, as used to describe the R group of monomer (B) and the R' group of monomer (C), has a predominantly hydrocarbon character within the context of the present invention. The term "moiety" and "group" are used herein interchangably. Such moieties include:

(1) Hydrocarbon groups; that is, aliphatic groups, aromatic-and alicyclic-substituted groups, and the like, of the type known to those skilled in art.

(2) Substituted hydrocarbon groups; that is, groups containing pendent non-hydrocarbon substituents, that in the context of this invention, do not alter the predominantly hydrocarbon character of the group or interfere with the condensation polymerization and the oxygen scavenging properties of the resultant scavenger material in the contemplated application. Those skilled in the art will be aware of suitable substituents; examples are halo, nitro, silyl, siloxy, alkoxy, carbalkoxy, and alkythio.

(3) Hetero groups; that is, groups which, while predominantly hydrocarbon in character within the context of this invention, contain atoms other than carbon present as a member of the linear structure of a chain or ring otherwise composed of carbon atoms. Suitable hetero atoms will be apparent to those skilled in the art and include, for example, nitrogen, oxygen, silicon and sulfur.

More specifically, the hydrocarbon based group can be substituted or unsubstituted, cyclic or non-cyclic, linear or branched, aliphatic, aromatic, or mixed aliphatic and aromatic including hydrocarbyl, hydrocarbylene, hydrocarbyloxy, hydrocarbylsilyl, hydrocarbylamino, and hydrocarbylsiloxy groups.

The X and Y groups of the alicyclic compound, monomer (A), the F group of the compound having ionomeric functionality, monomer (B), and the G group of the polyfunctional compound, monomer (C), are selected from (i) hydroxyl groups and/or primary amino groups, on the one hand, and (ii) carboxylic acid groups, carboxylic acid ester groups, acid halide groups, isocyanate groups or mixtures thereof on the other hand, so as to provide a molar ratio (i) to (ii) of 1:1 with from 0.9:1 to 1.1:1, such as from 0.95:1 to 1.05:1 being appropriate to form a condensation polymer having polyester lingages, polyurethane linkages and/or polyamide linkages between residual monomeric units of (A), (B) and (C).

The preparation of the subject polymer can be carried out using conventional processes for forming condensation polymerization polymer products. The monomers are contacted at elevated temperature (normally at temperatures of from 12° C. to 300° C., such as from 190° C. to 260° C. with the elimination of water or other condensation by-product.

In one embodiment, when monomer (A) described above has X and Y groups selected from carboxylic acid groups, alkyl carboxylic acid groups, their lower $C_1$–$C_3$ alkyl ester derivatives or X and Y groups together represent an acid anhydride, then monomer (B) described above has at least two F groups and that each of the F groups is selected from hydroxyl group, carboxylic acid group, alkyl carboxylic acid group or their lower $C_1$–$C_3$ alkyl ester derivatives, and monomer (C) described above has at least two G groups, two of said G groups are at terminal (alpha, omega) positions of the monomer molecule, excess G groups over two are pendent from any carbon atom of the R' hydrocarbyl group, and each of said G groups is independently selected from hydroxyl group; primary amino group; or isocyanate group.

In another embodiment, when X and Y groups of monomer (A) are independently selected from amino, or hydroxyl groups or alkyl amino or alkyl hydroxyl groups then the G groups of monomer (C) are independently selected from carboxylic acid, alkyl carboxylic acid or $C_1$–$C_3$ alkyl ester derivative thereof, or an acid halide.

The condensation polymer should be composed of from 40 to 60 (such as from 45 to 50) molar percent of monomer (A); from 0.25 to 20 (such as from 0.5 to 10) molar percent of monomer (B) and from 60 to 40 such as from 50 to 55) molar percent of monomer (C); all by weight of the condensation polymer.

It has been determined than when higher addition levels of monomer B (approximately 15% by weight and higher) are incorporated, this leads to the preparation of a water soluble oxygen scavenger composition. Such water soluble polymers are useful for preparation of aqueous based coatings, which may be used to coat paper, cardboard and plastic surfaces and may also be used as a lamination adhesive.

The compositions of this invention produce significantly less oxidative by-products caused by the oxygen scavenging process than those described in the prior art, and they do not require the use of high levels of adjuncts to absorb these undesirable by-products. Such absorbent additives are known in the art, for example see U.S. Pat. No. 5,834,079 and U.S. Pat. No. 08/857,276. It is also well known in the art that such additives (zeolites and silicas) adversely effect the haze and clarity of packaging structures.

The compositions of this invention can be used in a wide range of packaging materials, and are not restricted to flexible packaging films and articles such as pouches produced from such films. The compositions may also be used in the preparation of rigid and semi-rigid packaging materials. Typical rigid and semi-rigid articles include plastic, paper or cardboard cartons, bottles such as juice containers, thermoformed trays, or cups with wall thicknesses of about 100 to 2000 microns. The walls of such articles comprise single or multiple layers of materials. The compositions can be used as the sole polymeric material from which one or more layers of a film are formed (i.e., the film can be a multilayer film having, for example, a gas barrier layer, a sealant layer, etc.), it can be blended with other polymeric oxygen scavenging agents (such as polybutadiene, poly (ethylene/vinyl cyclohexene) or poly (ethylenemethylacrylate/cyclohexenylmethylacrylate copolymer (EMCM) or it can be blended with one or more diluent polymers which are known to be useful in the formation of packaging film materials and which often can render the resultant film more flexible and/or processible. Suitable diluent polymers include, but are not limited to, polyethylenes such as, for example, low-density polyethylene, very low-density polyethylene, ultra-low density polyethylene, high-density polyethylene, and linear low density polyethylene; polyesters such as, for example, polyethylene terephthalate (PET) or polyethylene naphthenate (PEN); polyvinyl chloride (PVC); polyvinylidene chloride (PVDC); polycaprolactone polymers and ethylene copolymers such as ethylene/vinyl acetate copolymers (EVA and VAE), ethylene/alkyl (meth)acrylate copolymers (EMA), ethylene/vinyl alcohol copolymers, ethylene/(meth)acrylic acid copolymers, ethylene/butyl acrylate (EBA) copolymers, ethylene/vinyl alcohol, ethylene/acrylic acid (EAA), and ionomers. Blends of different diluent polymers also can be used.

The compositions of this invention can also be used in non-integral packaging components such as coatings, sachets, bottle cap liners, adhesive and non adhesive sheet inserts, lamination adhesive, coupons, gaskets, sealants or fibrous mat inserts.

Selection of a particular diluent polymer(s) depends largely on the article to be manufactured and the end use thereon. For instance, certain polymers are known by the ordinarily skilled artisan to provide clarity, cleanliness, barrier properties, mechanical properties, and/or texture to the resultant article.

In combination with the polymeric component, the oxygen scavenger composition of the present invention includes a transition metal compound, as an oxygen scavenger catalyst. The transition metal catalyst can be a salt, compound or complex which includes a metal selected from the first, second, or third transition series of the Periodic Table, such as Rh, Ru, or one of the elements in the series of Sc to Zn (i.e., Sc, Ti, V, Cr, Mn, Fe, Co, Ni, Cu, and Zn). Suitable anions for such salts include, but are not limited to, chloride, acetate, oleate, stearate, palmitate, 2-ethylhexanoate, neodecanoate, and naphthenate. Representative salts include cobalt (II) 2-ethylhexanoate, cobalt oleate, and cobalt (II) neodecanoate. (The metal salt also can be an ionomer, in which case a polymeric counter ion may be employed.)

When used in forming a packaging article, the oxygen scavenger composition of the present invention can include only the above-described polymers and a transition metal catalyst. However, photoinitiators can be added to further facilitate and control the initiation of oxygen scavenging properties. Adding a photoinitiator or a blend of photoinitiators to the oxygen scavenging composition can be beneficial where antioxidants have been added to prevent premature oxidation of the composition during processing and storage. Suitable photoinitiators are known to those skilled in the art. See, e.g., PCT publication WO 97/07161, WO 97/44364, WO 98/51758, and WO 98/51759, the teachings of which are incorporated herein by reference in their entirety. Specific examples of suitable photoinitiators include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis (dimethylamino)-benzophenone, acetophenone and its derivatives, such as, o-methoxy-acetophenone, 4'-methoxyacetophenone, valerophenone, hexanophenone, a-phenylbutyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones; alpha-tetralone, 9-acetylphenanthrene, 2-acetylphenanthrene, 10-thioxanthenone, 3-acetyl-phenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, benz[a]anthracene-7, 12-dione, 2,2-dimethoxy-2-phenylacetophenone, diethoxyacetophenone, dibutoxyacetophenone, 4-benzoyl4'-methyl(diphenyl sulfide), 2,4,6-trimethylbenzoyldiphenylphosphine oxide, bis-(2,4,6-trimethylbenzoyl)phenylphosphine oxide (Irgacure 819), bis (2,6-dimethoxybenzoyl)-2,4,4-trimethylpentylphosphine oxide, and the like.

Single oxygen-generating photosensitizers such as Rose Bengal, methylene blue, and tetraphenylporphine as well as polymeric initiators such as poly(ethylene carbon monoxide) and oligo[2-hydroxy-2-methyl-1-[4-(1-methylvinyl)phenyl]propanone] also can be used. However, photoinitiators generally provide faster and more efficient initiation. When actinic radiation is used, photoinitiators also can provide initiation at longer wavelengths which are less costly to generate and present less harmful side effects than shorter wavelengths. When the diluent resins are PET or PEN and the like, photoinitiators that absorb at longer wavelengths in order to allow adequate triggering are beneficial.

When a photoinitiator is included, it can enhance and/or facilitate the initiation of oxygen scavenging by the composition of the present invention upon exposure to radiation. The amount of photoinitiator can depend on the amount and type of cyclic unsaturation present in the polymer, the wavelength and intensity of radiation used, the nature and amount of antioxidants used, and the type of photoinitiator used. The amount of photoinitiator also can depend on how the scavenging composition is used. For instance, if a photoinitiator-containing composition is in a film layer, which is underneath another layer that is somewhat opaque to the radiation used, more initiator might be needed. However, the amount of photoinitiator used for most applications ranges from 0.01 to 10% (by wt.) of the total composition. Oxygen scavenging can be initiated by exposing an article containing the composition of the present invention to actinic or electron beam radiation, as described below.

One or more known antioxidants can be incorporated into the scavenging composition of the present invention to retard degradation of the components during compounding and film formation. Although such additives prolong the induction period for oxygen scavenging activity to occur in the absence of irradiation, the layer or article (and any incorporated photoinitiator) can be exposed to radiation at the time oxygen scavenging properties are required. Suitable antioxidants include but are not limited to 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, vitamin E (alpha-tocopherol), octadecyl-3,5,-di-tert-butyl-4-hydroxyhydrocinnamate, tetrakis[methylene(3,5-di-tert-butyl-4-hydroxyhydrocinnamate)]methane, tetrakis(2,4-di-tert-butylphenyl)-4,4'-biphenyldiphosphonite and the like.

When an antioxidant is included as part of the composition of the present invention, it can be present in an amount sufficient to prevent oxidation of the components of the oxygen scavenging composition as well as other materials present in a resultant blend during formation and processing; but less than that which interferes with the scavenging activity of the resultant layer, film, or article after initiation has occurred. The amount needed in a given composition can depend i.a. on the components present therein, the particular antioxidant used, the degree and amount of thermal processing used to form the shaped article, and the dosage and wavelength of radiation applied to initiate oxygen scavenging. Typically, such antioxidant(s) are used in an amount of from 0.01 to 1% (by weight of the oxygen scavenger composition).

Other additives that also can be included in the oxygen scavenger composition of the present invention include, but are not necessarily limited to, fillers, pigments, dyestuffs, processing aids, plasticizers, antifog agents, antiblocking agents, and the like.

The amounts of the components used in the oxygen scavenging composition of the present invention can affect the use and effectiveness of this composition. Thus, the amounts of polymer, transition metal catalyst, and any photoinitiator, antioxidant, polymeric diluents, additives, etc., can vary depending on the desired article and its end use. For example, one of the primary functions of the polymer described above is to react irreversibly with oxygen during the scavenging process, while a primary function of the transition metal catalyst is to facilitate this process. Thus, to a large extent, the amount of polymer present affects the oxygen scavenging capacity of the composition, i.e., the amount of oxygen that the composition can consume, while the amount of transition metal catalyst affects the rate at which oxygen is consumed as well as the induction period.

The composition of the present invention can provide oxygen scavenging properties at a desirable rate and capacity while having good processing and compatibility properties relative to compositions including conventional ethylenically unsaturated polymers which are not formed with component (B) of the present polymeric oxygen scavenger. Thus, the present composition can be used to provide, by itself or as a blend with diluent film-forming polymers such as polyolefins and the like, a packaging material or film that can be manufactured and processed easily. Further, the subject oxygen scavenging composition will deplete the oxygen within a package cavity without substantially detracting from the color, taste, and/or odor of the product contained therein. In addition, the present oxygen scavenger composition has enhanced processability both in its formation as a film material and in its handling and processing to form a packaging material. Finally, the present oxygen scavenger composition has been found to provide enhanced scavenger properties when used under ambient temperature and/or refrigeration temperature conditions.

The amount of the condensation polymer contained in the subject composition needs to be determined based on the end use of the article and can range from 1 to 100%, such as 5 to 97.5%, from 10 to 95%, from 15 to 92.5%, and from 20 to 90%, with all of the foregoing percentages being by weight of the composition or layer made therefrom. Incorporation of low levels of the subject polymeric scavenger, e.g., 1 to 20% by weight, can be used for active barrier applications to prevent oxygen ingress into the container, Higher levels of the subject polymeric scavenger, e.g., 21 to 100% by wt. can be used for headspace oxygen scavenging applications where large quantities of oxygen need to be removed from the package.

Typically, the amount of transition metal catalyst can range from 0.001 to 1% (by wt.) of the scavenging composition, based on the metal content only (i.e., excluding ligands, counter ions, etc.). Where one or more other scavenging compounds and/or diluent polymers are used as part of the composition, such other materials can make up as much as 99%, such as up to 75%, by weight of the scavenging composition. Any further additives employed normally do not make up more than 10%, such as no more than about 5%, by weight of the scavenging composition. As indicated above, the composition of the present invention can be used to produce a scavenging monolayer film, a scavenging layer of a multilayer film, or other articles for a variety of packaging applications. Single layer articles can be prepared readily by extrusion processing and provide a product having low tack properties. Such properties, as discussed above, provide enhanced processability in formation of a defect free film and the like packaging article and, further, in processing as part of the finished packaging article. Multilayer films typically are prepared using coextrusion, coating, lamination or extrusion/lamination as taught in, for example, U.S. Pat. Nos. 5,350,622 and 5,529, 833, the teachings of which are incorporated herein by reference in their entirety.

At least one of the additional layers of a multilayer article can include a barrier type material having a permeance to oxygen of no more than about $5.8 \times 10^{-8}$ cm$^3$/m$^2$-s-Pa (i.e., about 500 cm$^3$/m$^2$-24 hours-atm), such as no more than $1.06 \times 10^{-8}$ cm$^3$/m$^2$-s-Pa (i.e., 100 cm$^3$/m$^2$-24 hours-atm), such as no more than $0.58 \times 10^{-8}$ cm$^3$/m$^2$-s-Pa (i.e., 50 cm$^3$/m$^2$-24 hours-atm) at 25° C. Polymers which are commonly used in such oxygen barrier layers include poly (ethylene/vinyl alcohol)(EVOH), poly(vinyl alcohol) (PVOH), polyacrylonitrile (PAN), polyvinyl chloride (PVC), poly(vinylidene dichloride) (PVDC), polyethylene terephthalate (PET), silica (SiO$_x$), and polyamides such as polycaprolactam (nylon 6), metaxylylene adipamide (MXD6), hexamethylene adipamide (nylon 66), as well as various amide copolymers. (Metal foil layers can also provide oxygen barrier properties.) Other additional layers can include one or more layers which are permeable to oxygen. In one preferred packaging construction, especially flexible packages for food, the layers can include (in order starting from the outside of the package to the innermost layer of the package) (a) an oxygen barrier layer, (b) a scavenging layer, i.e. one that includes the scavenging composition described above, and optionally, (c) an oxygen permeable layer. Control of the oxygen barrier property of layer (a) provides a means to regulate the scavenging life of the package by limiting the rate of oxygen entry to the scavenging layer (b), thus limiting the rate of consumption of scavenging capacity. Control of the oxygen permeability of layer (c) provides a means to set an upper limit on the rate of oxygen scavenging for the overall structure independent of the composition of scavenging layer (b). This can serve the purpose of extending the handling lifetime of the film in the presence of air prior to sealing of the package. Furthermore, layer (c) can provide a barrier to migration of the individual components or byproducts of the scavenging layer into the package interior. The term "exposed to the interior" refers to a portion of a packaging article having the subject scavenging composition which is either directly exposed or indirectly exposed (via layers which are O$_2$ permeable) to the interior cavity having oxygen sensitive product, Even further, layer (c) also can improve the heat sealability, clarity, and/or resistance to blocking of the multilayer film. Further additional layers, such as tie (adhesive) layers, easy open layers, and seal layers, can also be used. Polymers typically used in such tie layers include, for example, anhydride functional polyolefins.

The method of the present invention includes exposing the above-described composition to a package cavity having an oxygen sensitive product therein. One embodiment provides for including an antioxidant and a photoinitiator as part of the subject composition and subjecting a packaging material such as a film, layer, or article that includes such a composition to radiation so as to initiate oxygen scavenging on demand at desired rates. In this embodiment the thermal radiation used in heating and processing the polymers typically used in packaging films (e.g., 100–250° C.) advantageously does not trigger the oxygen scavenging reaction.

However, there may exist applications in which triggering is not possible or desired. Therefore, if low amounts of antioxidant are used in the polymer formulation in conjunction with the catalyst it is possible to prepare a composition which would become actively oxygen scavenging upon extrusion. These materials would need to be used immediately or in some way protected from oxygen during storage.

The initiating radiation is actinic, e.g., UV or visible light having a wavelength of from about 200 to about 750 nm, preferably of from about 200 to 600 nm, and most preferably from about 200 to 400 nm. Such light can be delivered in a continuous or pulsed manner. The layer, film, etc., containing the oxygen scavenging composition is exposed to such radiation until it receives at least about 1 J/g of radiation, e.g. until it receives a dose in the range of 10 to 2000 J/g. The radiation also can be electron-beam radiation at a dosage of at least 2 kilogray (kGy), such as from 10 to 100 kGy. Other potential sources of radiation include ionizing radiation such as gamma, X-ray, and corona discharge. Duration of exposure depends on several factors including, but not limited to, the amount and type of photoinitiator present, thickness of the layers to be exposed, thickness and opacity of intervening layers, amount of any antioxidant present, and the wavelength and intensity of the radiation source.

When using oxygen scavenging layers or articles, irradiation can occur during or after the layer or article is prepared. If the resulting layer or article is to be used to package an oxygen sensitive product, exposure can be just prior to, during, or after packaging. For best uniformity of irradiation, exposure occurs at a processing stage where the layer or article is in the form of a flat sheet. For further information on initiation via irradiation, the reader is directed to PCT publications WO 98/05555 and WO 98/05703, as well as PCT 97/13598, 97/13370, 97/13369, the teachings of which are incorporated herein by reference.

Determining the oxygen scavenging rate and capacity of a given oxygen scavenging composition contemplated for a particular use can be beneficial. To determine the rate, the time elapsed before the scavenger depletes a certain amount of oxygen from a sealed container is measured. In some instances the rate can be determined adequately by placing a film containing the desired scavenging composition in an air-tight, sealed container of an oxygen containing atmosphere, e.g., air which typically contains 20.6% (by vol.) $O_2$ or some other quantity such as 1% (by vol.) $O_2$. Over time, samples of the atmosphere inside the container are removed to determine the percentage of oxygen remaining. Usually, the specific rates obtained vary under different temperature and atmospheric conditions. Atmospheres having lower initial oxygen content and/or maintained under low temperature conditions provide a more stringent test of the scavenging ability and rate of a composition. The rates which follow are at room temperature and one atmosphere of air, unless otherwise specified. When an active oxygen barrier is needed, a useful scavenging rate can be as low as 0.05 $cm^3$ oxygen per gram of the polymer in the scavenging composition per day in air at 25° C. and at 1 atm (101.3 kPa). However, in most instances, the present composition has a rate equal to or greater than about $5.8 \times 10^{-6}$ $cm^3/g \cdot S$ (0.5 $cm^3/g \cdot day$), such as greater than $5.8 \times 10^{-5}$ $cm^3/g \cdot S$ (5 $cm^3/g \cdot day$). Further, films or layers including the subject composition are capable of a scavenging rate greater than $1.2 \times 10^{-4}$ $cm^3/m^2 \cdot S$ (10 $cm^3/m^2 \cdot day$),) and under some conditions, greater than $2.9 \times 10^{-4}$ $cm^3/m^2 \cdot S$ (25 $cm^3/m^2 \cdot day$). Generally, films or layers generally deemed suitable for use as an active oxygen barrier can have a scavenging rate as low as $1.2 \times 10^{-5}$ $cm^3/m^2 \cdot S$ (1 $cm^3/m^2 \cdot day$) when measured in air at 25° C. and 101 kPa (1 atm). Scavenging rates suitable for refrigeration temperature conditions are attained with the present composition. Such rates make those layers suitable for scavenging oxygen from within a package, as well as suitable for active oxygen barrier applications.

When the method of the present invention is to be used in an active oxygen barrier application, the initiated oxygen scavenging activity, in combination with any oxygen barriers can, in one embodiment, create an overall oxygen permeance of less than about $1.1 \times 10^{-10}$ $cm^3/m^2 \cdot s \cdot Pa$ (1.0 $cm^3/m^2 \cdot day \cdot atm$) at 25° C., and the oxygen scavenging capacity is such that this value is not exceeded for at least two days.

Once scavenging has been initiated, the scavenging composition, layer, or article prepared therefrom preferably is able to scavenge up to its capacity, i.e., the amount of oxygen which the scavenger is capable of consuming before it becomes ineffective. In actual use, the capacity required for a given application can depend on the quantity of oxygen initially present in the package, the rate of oxygen entry into the package in the absence of the scavenging property, and the intended shelf life for the package. When using scavengers that include the composition of the present invention, the capacity can be as low as 1 $cm^3/g$, but can be 50 $cm^3/g$ or higher. When such scavengers are in a layer of a film, the layer can have an oxygen capacity of at least about 4.9 $cm^3/m^2$ per pm thickness (125 $cm^3/m^2$ per mil), such as at least about 11.5 $cm^3/m^2$ per $\mu$m thickness (300 $cm^3/m^2$ per mil).

The composition of the present invention has been found to be capable of providing a film, layer or article which substantially retains its physical properties (e.g., tensile strength and modulus) even after substantial oxygen scavenging has occurred. In addition, the present composition does not provide significant amounts of by-products and/or effluents, which can impart an undesired taste, color, and/or odor to the packaged product.

The compositions of this invention are significantly cleaner than those described in the prior art, they do not require the use of high levels of adjuncts to absorb the undesirable byproducts. Such absorbent additives are known in the art, for example see U.S. Pat. No. 5,834,079 and U.S. Pat. No. 08/857,276, it is also well know in the art that such additives (zeolites and silicas) adversely effect the haze and clarity of packaging structures.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLE 1

Cis-1,2,3,6-Tetrahydrophthalic Anhydride/1,6-Hexanediol Condensation Polymer with 10% Dimethyl 5-sulfoisophthalate, Sodium Salt THPA based polyesters were produced using a 2-step process. The first step involved condensation of the tetrahydrophthalic anhydride (THPA), 1,6-hexanediol, and dimethyl-5-sulfoisophthalate, sodium salt reactant with distillation of water and methanol from the mixture to give low molecular weight polyesters. The second step involved increasing the molecular weight of the polymers so produced via transesterification, by beating at higher temperatures under vacuum in the presence of an appropriate catalyst.

A 250 ml round bottom flask, equipped with a stirrer, heating mantle, thermocouple well, nitrogen inlet and a distillation head was charged with 75 g of 1,6-hexanediol, 18.6 g dimethyl 5-sulfoisophthalate, sodium salt, 0.15 g potassium carbonate, 0.07 g of trimethylolpropane, 500 ppm (0.09 g) IRGANOX™ 3114 and 0.045 g of titanium(IV) butoxide. The reaction mixture was heated to 144° C. for 1–2 hours until the white salt had all reacted and the solution cleared up. At this point, 86.25 g of cis-1,2,3,6-tetrahydrophthalic anhydride was added to the reaction mixture. This is a 1.008 mole ratio of diol to anhydride/ester. The reaction mixture was heated with distillation at 175° C. for one hour, then the temperature was increased to 220° C. and heated for one hour. During this time 11 g of distillate was collected.

In the second step, 0.05 g of additional titanium butoxide was added to the mixture, and the reaction mixture was heated under vacuum at 230° C. (0.2–0.6 mm) and held for 2.5 hours. The polymer was poured from the flask at 200° C. and the polymer was cooled to room temperature.

The polymer was a clear, light yellow, rubbery solid. It could be handled with the hands without sticking to the skin. It could be formed into block shapes. Analysis by Differential Scanning Calorimetry, DSC, showed the polymer had a Tg of −32.5° C.

EXAMPLE 2

Cis-1,2,3,6-Tetrahydrophthalic Anhydride/1,6-Hexanediol Condensation Polymer with 2.5% Dimethyl 5-sulfoisophthalate, Sodium Salt A 250 ml round bottom flask, equipped with a stirrer, heating mantle, thermocouple well, nitrogen inlet and a distillation head was charged with 69.39 g of 1,6-hexanediol, 86.25 g of 1,2,3,6-tetrahydrophthalic anhydride, 4.65 g dimethyl 5-sulfoisophthalate, sodium salt, 0.15 g potassium carbonate, 0.067 g of trimethylolpropane, 500 ppm IRGANOX™ 3114 and 0.05 g of titanium(IV) butoxide. This is a 1.008 mole ratio of diol to anhydride/ester. The reaction mixture was heated with distillation at 175° C. for one hour, then the temperature was increased to 190° C. and then to 220° C. and heated for one hour. During this time 13.7 g of distillate was collected.

In the second step, 0.05 g of additional titanium butoxide was added to the mixture, and the reaction mixture was heated under vacuum starting at 140° C. slowly increasing to 250° C. (0.2–0.6 mm) and held for two hours. The polymer was cooled to room temperature.

The polymer was a clear, yellow rubbery solid. It could be handled with the hands without sticking to the skin. It could be formed into block shapes. Analysis by Differential Scanning Calorimetry, DSC, showed the polymer had a Tg of −36° C.

EXAMPLES 3–6

Additional polymers containing dimethyl 5-sulfoisophthalate, sodium salt at 5% to 15% by weight were prepared according to the procedure described in Examples 1 and 2. See Tables 1 and 2 for details.

EXAMPLE 7

Preparation of Magnesium Salt of Dimethyl 5-sulfoisophthalate 200 g of magnesium acetate, Mg(OAc)$_2$•4H$_2$O were dissolved in 400 ml of distilled water in a 2 L beaker. Two batches of solutions of sodium dimethyl 5-sulfoisophthalate (50 g each) were prepared in 200 ml of hot distilled water. The 2 L beaker containing the magnesium acetate solution was placed on a hot plate and stirred vigorously with a magnetic stir bar. Heating was applied while slowly adding the two solutions of the sodium dimethyl 5-sulfoisophthalate one at a time, with stirring. A white precipitate formed.

The combined solution was heated and stirred until the solution was clear. At this time the beaker was removed from the heat and allowed to cool to room temperature. A white precipitate formed. The solids were collected on a large Buchner funnel and rinsed with 100 ml of cold distilled water. The precipitate was transferred to a clean 1 L beaker and 500 ml of cold distilled water was stirred in and the solution filtered again and rinsed with 100 ml of cold distilled water. The precipitate was transferred to a clean 2 L beaker and stirred into 700 ml of distilled water. The mixture was heated on a hot plate with stirring until dissolved to a clear solution. The beaker was removed from the hot plate and covered with aluminum foil and allow to cool and stand for 48 hours. The crystals were collected via filtration on a Buchner funnel and dried under vacuum at RT for 24 hours.

EXAMPLE 8

Cis-1,2,3,6-Tetrahydrophthalic anhydride/1,6-Hexanediol Condensation Polymer with 10% Dimethyl 5-sulfoisophthalate, Magnesium Salt A 250 ml round bottom flask, equipped with a stirrer, heating mantle, thermocouple well, nitrogen inlet and a distillation head was charged with 100 g of 1,6-hexanediol and 25 g dimethyl 5-sulfoisophthalate, magnesium salt, and 0.05 g of titanium(IV) butoxide. The reaction mixture was heated at 145° C. for 2–3 hours until the mixture was clear. At this point 115.0 g of 1,2,3,6-tetrahydrophthalic anhydride, 0.20 g potassium carbonate, 0.09 g of trimethylolpropane, and 500 ppm IRGANOX™ 3114 was added and the reaction mixture heated until distillation occurred at 155° C. The temperature was increased slowly in 10 degree increments to 210° C. and heated for one hour. During this time 19 g of distillate was collected.

In the second step, 0.05 g of additional titanium butoxide was added to the mixture, and the reaction mixture was heated under vacuum at 230° C. (0.2–0.6 mm) and held for one hour. The polymer was exceptionally thick and was poured onto TEFLON™ sheet and allowed to cool to room temperature.

The polymer was a clear, yellow rubbery solid.

EXAMPLE 9

Preparation of Lithium Salt of Dimethyl 5-sulfoisophthalate 200 g of lithium acetate, LiOAc•2H$_2$O were dissolved in 400 ml of distilled water in a 2 L beaker. Two batches of solutions of sodium dimethyl 5-sulfoisophthalate (50 g each) were prepared in 200 ml of hot distilled water. The 2 L beaker containing the lithium acetate solution was placed on a hot plate and stirred vigorously with a magnetic stir bar. Heating was applied while slowly adding the two solutions of the sodium dimethyl 5-sulfoisophthalate one at a time, with stirring. A white precipitate formed.

The combined solution was heated and stirred until the solution was clear. At this time the beaker was removed from the heat and allowed to cool to room temperature. A white precipitate formed. The solids were collected on a large Buchner funnel and rinsed with 100 ml of cold distilled water. The precipitate was transferred to a clean 1 L beaker and 500 ml of cold distilled water was stirred in and the solution filtered again and rinsed with 100 ml of cold distilled water. The precipitate was transferred to a clean 2 L beaker and stirred into 700 ml of distilled water. The mixture was heated on a hot plate with stirring until dissolved to a clear solution. The beaker was removed from the hot plate and covered with aluminum foil and allow to cool and stand for 48 hours. The crystals were collected via filtration on a Buchner funnel and dried under vacuum at RT for 24 hours.

EXAMPLE 10

Cis-1,2,3,6-Tetrahydrophthalic Anhydride/1,6-Hexanediol Condensation Polymer with 10% Dimethyl 5-sulfoisophthalate, Lithium Salt A 250 ml round bottom flask, equipped with a stirrer, heating mantle, thermocouple well, nitrogen inlet and a distillation head was charged with 75 g of 1,6-hexanediol and 18.6 g dimethyl 5-sulfoisophthalate, lithium salt. The reaction mixture was heated at 150° C. for five hours until the mixture was clear. At this point 115.0 g of 1,2,3,6-tetrahydrophthalic anhydride, 0.15 g potassium carbonate, 0.09 g of trimethylolpropane, 500 ppm IRGANOX™ 3114 and 0.05 g of titanium (IV) butoxide was added and the reaction mixture heated until distillation occurred at 165° C. The temperature was increased slowly in 10 degree increments to 210° C. and heated for one hour. During this time 11.2 g of distillate was collected.

In the second step, 0.05 g of additional titanium butoxide was added to the mixture, and the reaction mixture was heated under vacuum at 230° C. (0.2–0.6 mm) and held for one hour. The polymer was exceptionally thick and was poured onto TEFLON™ sheet and allowed to cool to room temperature.

The polymer was a clear, yellow rubbery solid. It could be handled with the hands with no sticking to the skin. It could be formed into block shapes. It was similar to the sodium ionomer material.

EXAMPLE 11

Preparation of Zinc Salt of Dimethyl 5-sulfoisophthalate 200 g of zinc acetate, Zn(OAc)$_2$•2H$_2$O were dissolved in 400 ml of distilled water in a 2 L beaker. Two batches of solutions of sodium dimethyl 5-sulfoisophthalate (50 g each) were prepared in 200 ml of hot distilled water. The 2 L beaker containing the zinc acetate solution was placed on a hot plate and stirred vigorously with a magnetic stir bar. Heating was applied while slowly adding the two solutions of the sodium dimethyl 5-sulfoisophthalate one at a time, with stirring. A white precipitate formed.

The combined solution was heated and stirred until the solution was clear. At this time the beaker was removed from the heat and allowed to cool to room temperature. A white precipitate formed. The solids were collected on a large Buchner funnel and rinsed with 100 ml of cold distilled water. The precipitate was transferred to a clean 1 L beaker and 500 ml of cold distilled water was stirred in and the solution filtered again and rinsed with 100 ml of cold distilled water. The precipitate was transferred to a clean 2 L beaker and stirred into 700 ml of distilled water. The mixture was heated on a hot plate with stirring until dissolved to a clear solution. The beaker was removed from the hot plate and covered with aluminum foil and allow to cool and stand for 48 hours. The crystals were collected via filtration on a Buchner funnel and dried under vacuum at RT for 24 hours.

EXAMPLE 12

Cis-1,2,3,6-Tetrahydrophthalic Anhydride/1,6-Hexanediol Condensation Polymer with 10% Dimethyl 5-sulfoisophthalate, Zinc Salt A 250 ml round bottom flask, equipped with a stirrer, heating mantle, thermocouple well, nitrogen inlet and a distillation head was charged with 75 g of 1,6-hexanediol, and 18.8 g dimethyl 5-sulfoisophthalate, zinc salt. The reaction mixture was heated at 150° C. for 1 hour until the mixture was clear. At this point 86.25 g of 1,2,3,6-tetrahydrophthalic anhydride, 0.15 g potassium carbonate, 0.09 g of trimethylolpropane, 500 ppm Irganox 3114 and 0.05 g of titanium (IV) butoxide was added and the reaction mixture heated until distillation occurred at 155° C. The temperature was increased slowly in 10-degree increments to 210° C. and heated for 1 hour. During this time 13.6 g of distillate was collected.

In the second step, 0.05 g of additional titanium butoxide was added and the reaction mixture was heated under vacuum at 230° C. (0.2–0.6 mm) and held for 3.5 hours. The polymer was exceptionally thick and was poured onto teflon sheet and allowed to cool to room temperature.

The polymer was a clear, yellow rubbery solid. It was slightly more tacky than the sodium ionomer material but was readily handled.

EXAMPLE 13

Cis-1,2,3,6-Tetrahydrophthalic Anhydride/3-Cyclohexene-1,1-dimethanol Condensation Polymer with 10% Dimethyl 5-sulfoisophthalate, Sodium Salt A 250 ml round bottom flask, equipped with a stirrer, heating mantle, thermocouple well, nitrogen inlet and a distillation head was charged with 36.6 g of 3-cyclohexene-1,1-dimethanol, 7.5 g dimethyl 5-sulfoisophthalate, sodium salt, 0.06 g potassium carbonate, 0.03 g of trimethylolpropane, 500 ppm IRGANOX™ 3114 and 0.02 g of titanium(IV) butoxide. The reaction mixture was heated with distillation at 145° C. for one hour until the mixture was clear. At this point 35 g of cis-1,2,3,6-tetrahydrophthalic anhydride was added and the reaction mixture heated to 165° C. for one hour. The temperature was increased to 185° C. for one hour than to 210° C. and heated for ½ hour. During this time 3.3 g of distillate was collected.

In the second step, 0.02 g of additional titanium butoxide was added to the mixture, and the reaction mixture was heated under vacuum at 230° C. (0.2–0.6 mm) and held for one hour. The prepared polymer was poured onto TEFLON™ sheet and allowed to cool to room temperature. The product was glass-like.

EXAMPLE 14

3-Cyclohexene-1,1-dimethanol/Adipic Acid Condensation Polymer with 10% Dimethyl 5-sulfoisophthalate, Sodium Salt A 250 ml round bottom flask, equipped with a stirrer, heating mantle, thermocouple well, nitrogen inlet and a distillation head was charged with 38 g of 3-cyclohexene-1,1-dimethanol, 7.9 g dimethyl 5-sulfoisophthalate, sodium salt, 0.06 g potassium carbonate, 0.03 g of trimethylolpropane, 500 ppm IRGANOX™ 3114 and 0.02 g of titanium (IV) butoxide. The reaction mixture was heated with distillation at 145° C. for one hour until the mixture was clear. At this point 35.0 g of adipic acid was added and the reaction mixture heated to 165° C. for one hour. The temperature was increased to 1 85° C. for one hour than to 210° C. and heated for ½ hour. During this time 8.1 g of distillate was collected.

In the second step, 0.02 g of additional titanium butoxide was added to the mixture, and the reaction mixture was heated under vacuum at 230° C. (0.2–0.6 mm) and held for one hour. The prepared polymer was poured onto TEFLON™ sheet and allowed to cool to room temperature. The polymer was tough and stretchy.

EXAMPLE 15

Cis-1,2,3,6-Tetrahydrophthalic Anhydride/1,4-Butanediol Condensation Polymer with 10% Dimethyl 5-sulfolsophthalate, Sodium Salt A 250 ml round bottom flask, equipped with a stirrer, heating mantle, thermocouple well, nitrogen inlet and a distillation head was charged with 66.3 g of 1,4-butanediol, 21.6 g dimethyl 5-sulfoisophthalate, sodium salt, 0.17 g potassium carbonate, 0.07 g of trimethylolpropane, 500 ppm IRGANOX™ 3114 and 0.045 g of titanium (IV) butoxide. The reaction mixture was heated with distillation at 145° C. for one hour until the mixture was clear. At this point 100.0 g of 1,2,3,6-tetrahydrophthalic anhydride was added and the reaction mixture heated to 165° C. for one hour. The temperature was increased to 185° C. for one hour than to 210° C. and heated for ½ hour. During this time 16.5 g of distillate was collected.

In the second step, 0.045 g of additional titanium butoxide was added to the mixture, and the reaction mixture was heated under vacuum at 230° C. (0.2–0.6 mm) and held for one hour. The prepared polymer was poured onto TEFLON™ sheet and allowed to cool to room temperature. The polymer was a rubbery solid.

EXAMPLE 16

Cis-1,2,3,6-Tetrahydrophthalic Anhydride/1,10-Decanediol Condensation Polymer with 10% Dimethyl 5-sulfoisophthalate, Sodium Salt A 250 ml round bottom flask, equipped with a stirrer, heating mantle, thermocouple well, nitrogen inlet and a distillation head was charged with 102.6 g of 1,10-decanediol, 17.3 g dimethyl 5-sulfoisophthalate, sodium salt, 0.15 g potassium carbonate, 0.06 g of trimethylolpropane, 500 ppm IRGANOX™ 3114 and 0.045 g of titanium (IV) butoxide. The reaction mixture was heated with distillation at 150° C. for 2 hours until the mixture was clear. At this point 80 g of 1,2,3,6-tetrahydrophthalic anhydride was added and the reaction mixture heated to 165° C. for one hour. The temperature was increased to 185° C. for one hour than to 210° C. and heated for ½ hour. During this time 8 g of distillate was collected.

In the second step, 0.045 g of additional titanium butoxide was added and the reaction mixture was heated under vacuum at 230° C. (0.2–0.6 mm) and held for one hour. The prepared polymer is poured onto TEFLON™ sheet and allowed to cool to room temperature. A somewhat stretchy solid was obtained.

COMPARATIVE EXAMPLE 1 cis-1,2,3,6-Tetrahydrophthalic Anhydride/1,6-Hexanediol Condensation Polymer

A 250 ml round bottom flask, equipped with a stirrer, heating mantle, thermocouple well, nitrogen inlet and a distillation head was charged with 78.29 g of 1,6-hexanediol, 100 g of tetrahydrophthalic anhydride, 0.0705 g of trimethylolpropane (800 ppm on THPA) and 0.05 g of titanium butoxide. The mole ratio of diol to anhydride was 1.008. The reaction mixture was heated with distillation at 210° C. for one hour, then the temperature was increased to 230° C. and heated for one hour. During this time 11.4 g of distillate was collected. The distillate was predominantly water, but also contained some 1,6-hexanediol.

In the second step, 0.05 g of additional titanium butoxide was added and the reaction mixture was heated to 230° C. under vacuum (0.2–0.6 mm) and held for three hours. The polymer was cooled to room temperature.

The polymer was a soft, somewhat sticky solid material and exhibited some degree of cold flow. Analysis by Differential Scanning Calorimetry, DSC, showed the polymer had a $T_g$ of −35.6° C.

COMPARATIVE EXAMPLE 2 cis-1,2,3,6-Tetrahydrophthalic Anhydride/1,6-Hexanediol Condensation Polymer with 10% Isophthalic Acid A 250 ml round bottom flask, equipped with a stirrer, heating mantle, thermocouple well, nitrogen inlet and a distillation head was charged with 100 g of 1,6-hexanediol, 115.3 g of 1,2,3,6-tetrahydrophthalic anhydride, 13.98 g isophthalic acid, 0.09 g of trimethylolpropane, 0.10 g IRGANOX™ 3114 and 0.05 g of titanium butoxide. The molar ratio of diol to anhydride plus acid was 1.008. The reaction mixture was heated with distillation at 210° C. for one hour, then the temperature was increased to 240° C. and heated for one hour. During this time 15.8 g of distillate was collected. The distillate was predominantly water, but also contained some 1,6-hexanediol.

In the second step, 0.05 g of additional titanium butoxide was added to the mixture, and the reaction mixture was heated to 230° C. under vacuum (0.2–0.6 mm) and held for three hours. The polymer was cooled to room temperature.

The polymer was a soft, sticky solid material. It exhibited some degree of cold flow. It was not tough or rubbery when compared to the material prepared as the ionomeric polymer formed with dimethyl 5-sulfoisophthalate, sodium salt. Analysis by Differential Scanning Calorimetry, DSC, showed the polymer had a $T_g$ of −37.5° C.

EXAMPLE 17

Oxygen Scavenging Analysis

The oxygen scavenging properties of several of the prepared polyesters were tested by first separately blending each formed material with a commerial polyethylene carrier resin in a 30:70 ratio. Each of the blends was formed into a film for testing.

The tests were conducted by placing 25 g of polyester material to be tested into a 12 ounce glass jar with 3000 ppm (0.075 g) of PEPQ™ (tetrakis(2,4-di-tert-butylphenyl)-4,4'-biphenyldiphosphonite), and 500 ppm (0.0125 g) of E-201, (Vitamin E). The mixture was heated to melting in a 180° C. oil bath. In a second jar was placed a commercially available polyethylene (35,000 molecular weight polyethylene: Aldrich 42,779–9) which was also heated to melting in the oil bath. When both materials melted, 58.3 g of the melted polyethylene was added to the jar of melted polyester and the two materials were vigorously stirred together. This gave 30% polyester and 70% polyethylene by weight composition. To this mixture was added 1000 ppm (0.08g) 4,4-dimethylbenzophenone (Lancaster Synthesis) and 1000 ppm of cobalt i.e., 0.37 g cobalt neodecanoate (CO TENCEM™, OMG Inc., 22.5% Co). After mixing well the material was poured out onto a TEFLON™ sheet and allowed to cool to room temperature. The sheet was cut into approximate 1 inch squares and pressed into film between TEFLON™ sheets using a Carver press at its lowest temperature setting of about 140° C.

The pressed monolayer scavenging film was cut into a 10 cm×10 cm piece, exposed to UV-C radiation for 90 seconds using a Anderson-Vreeland exposure unit. The film was then placed into a 16 cm×24 cm pouch prepared from a commerial barrier film (Cryovac P640B™) and heat-sealed under vacuum. 300 cc of air or 1% O$_2$ in N$_2$ was then introduced via septa. The oxygen content of each pouch was measured at regular intervals thereafter by withdrawing 8 cc samples of the atmosphere in the pouch via gas tight syringe and injecting the retrieved sample into a MOCON® Model PacCheck 650. Samples were prepared and tested in triplicate. Samples were stored at either room temperature conditions or in a refrigerator at 4° C. Samples were also tested without irradiation to measure storage stability and all samples were found to be stable during the test period. Data is reported in Tables 1 and 2 below.

TABLE 1

Oxygen Scavenging Data
1% Starting Oxygen Levels and Refrigerated Storage Conditions

| Example | Polymer Composition | Tg ° C. | Ox. Scavenging w/ 1% O$_2$ Chilled | | |
|---|---|---|---|---|---|
| | | | Rate: (cc/m$^2$ · d) | | Capacity: (cc O$_2$/g) |
| | | | Day 1 | Day 4 | Day 14 |
| 2 | 2.5% Dimethyl-5-Sulfo-isophthalate sodium salt/HD/THPA | −36.9 | 35.4 | 29.6 | 10.2 |
| 3 | 5.0% Dimethyl-5-Sulfo-isophthalate sodium salt/HD/THPA | −36.0 | 40.5 | 25.6 | 8.8 |
| 4 | 7.5% Dimethyl-5-Sulfo-isophthalate sodium salt/HD/THPA | −36.2 | 45.0 | 26.2 | 8.2 |
| 1 | 10% Dimethyl-5-Sulfo-isophthalate sodium salt/HD/THPA | −34.9 | 34.9 | 23.1 | 7.4 |
| 5 | 12.5% Dimethyl-5-Sulfo-isophthalate sodium salt/HD/THPA | −34.6 | 41.5 | 24.9 | 6.4 |
| 6 | 15% Dimethyl-5-Sulfo-isophthalate sodium salt/HD/THPA | −34.7 | 32.4 | 22.3 | 7.3 |
| 10 | 10% Dimethyl-5-Sulfo-isophthalate Lithium salt/HD/THPA | −34.5 | 42.0 | 24.7 | 7.1 |
| 13 | 10% Dimethyl-5-Sulfo-isophthalate sodium salt/3-Cyclohexene-1,1-dimethanol/THPA | +36.6 | 2.5 | 0.6 | 0.5 |
| 14 | 10% Dimethyl-5-Sulfo-isophthalate sodium salt/3-Cyclohexene-1,1-dimethanol/Adipic Acid | −23.3 | 55.7 | 27.8 | 8.1 |
| 15 | 10% Dimethyl-5-Sulfo-isophthalate sodium salt/BD/THPA | −8.8 | 3.5 | 10.5 | 7.2 |
| 16 | 10% Dimethyl-5-Sulfo-isophthalate sodium salt/DD/THPA | −41.1 | 63.3 | 31.5 | 8.1 |
| Comp. 1 | 0% Ionomer - HD/THPA Control | −35.6 | 56.7 | 31.7 | 8.8 |
| Comp. 2 | 10% addition of Isophthalic acid as a control in HD/THPA based polymer | −37.5 | 76 | 34.4 | 8.6 |

TABLE 2

Oxygen Scavenging Data
20.6% Starting Oxygen Levels (Room Air) and Room Temperature Storage Conditions

| Example | Polymer Composition | Tg ° C. | Ox Scavenging w/Room Air @ R. Temp | | |
|---|---|---|---|---|---|
| | | | Rate: (cc/m$^2$ · d) | | Capacity: (cc O$_2$/g) |
| | | | Day 1 | Day 4 | Day 14 |
| 2 | 2.5% Dimethyl-5-Sulfo-isophthalate sodium salt/HD/THPA | −36.9 | 749.1 | 333.9 | 105.8 |
| 3 | 5.0% Dimethyl-5-Sulfo-isophthalate sodium salt/HD/THPA | −36.0 | 566.9 | 292 | 96.4 |
| 4 | 7.5% Dimethyl-5-Sulfo-isophthalate sodium salt/HD/THPA | −36.2 | 491 | 234.8 | 93.5 |
| 1 | 10% Dimethyl-5-Sulfo-isophthalate sodium salt/HD/THPA | −34.9 | 485.9 | 218.8 | 79.2 |
| 5 | 12.5% Dimethyl-5-Sulfo-isophthalate sodium salt/HD/THPA | −34.6 | 334.1 | 148.8 | 69.8 |
| 6 | 15% Dimethyl-5-Sulfo-isophthalate sodium salt/HD/THPA | −34.7 | 425.2 | 187.6 | 82.9 |
| 10 | 10% Dimethyl-5-Sulfo-isophthalate Lithium salt/HD/THPA | −34.5 | 480.9 | 250.8 | 85.0 |
| 13 | 10% Dimethyl-5-Sulfo-isophthalate sodium salt/3-Cyclohexene-1,1-dimethanol/THPA | +36.6 | 35.4 | 50.7 | 32.3 |
| 14 | 10% Dimethyl-5-Sulfo-isophthalate sodium salt/3-Cyclohexene-1,1-dimethanol/Adipic Acid | −23.3 | 931.4 | 410.2 | 101.8 |
| 15 | 10% Dimethyl-5-Sulfo-isophthalate sodium salt/BD/THPA | −8.8 | 410 | 235.5 | 67.3 |
| 16 | 10% Dimethyl-5-Sulfo-isophthalate sodium salt/DD/THPA | −41.1 | 734 | 284 | 60.1 |
| Comp. 1 | 0% Ionomer - HD/THPA Control | −35.6 | 845.3 | 397.3 | 117.3 |
| Comp. 2 | 10% addition of Isophthalic acid as a control in HD/THPA based polymer | −37.5 | 734 | 378.1 | 117.7 |

We claim:

1. A film comprising at least one layer, the layer comprising an oxygen scavenger composition comprising a condensation polymer and a transition metal salt, compound or complex, wherein said polymer comprises mer units derived from (A) at least one or a mixture of substituted alicyclic compounds having non-aromatic, ethylenic functionality according to the following representation:

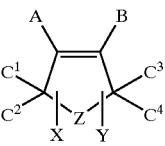

wherein
A, B, C$^1$, C$^2$, C$^3$, C$^4$ each independently represents hydrogen or a C$_q$H$_{2q+1}$ hydrocarbyl group with q being an integer in the range of from 0 to 20, provided that either A or B and at least one of $C^1$, $C^2$, $C^3$, $C^4$ are hydrogen atoms and each carbon atom of the alicyclic ring is fully substituted by groups selected from hydrogen, hydrocarbyl X or Y groups or mixtures thereof to fill its valence state;

X and Y each independently or together represents functional groups that is capable of being part of a heteroatom containing linkage forming a covalent bond linkage between the cycloalkenyl containing group and other monomeric groups forming the condensation polymer; and Z being selected from a —$(C_tH_{2t})$— hydrocarbylene group with t being an integer in the range from 1–4;

(B) at least one or a mixture of substituted non-aromatic or aromatic hydrocarbyl compounds having ionomeric functionality according to the following representation:

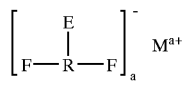

wherein
R represents a non-aromatic or aromatic hydrocarbon group;
each F independently or two F groups together represent a functional group capable of being part of a heteroatam containing linkage between the hydrocarbon group R and other monomeric groups forming the condensation polymer;
E represents an anionic group selected from sulfonyl or carboxyl group;
M represents a cationic alkali metal ion or cationic alkaline earth metal ion; and
"a" represents an integer having the value equal to the numerical value of the valence of M; and (C) at least one or a mixture of di- or polyfunctional hydrocarbon compounds according to the following representation:

wherein
R' represents a non-aromatic or aromatic hydrocarbon group; and
each G independently represents a functional group capable of being part of a heteroatom containing linkage between the hydrocarbon group R' and the other monomeric groups forming the condensation polymer, and
x is at least 1.

2. The film of claim 1 wherein (A) comprises a monomer selected from 3-cycohexene-1,1-dimethanol, tetrahydrophthalic acid, dimethyl tetrahydrophthalate, tetrahydrophthalic anhydride, and mixtures thereof.

3. The film of claim 1 wherein (B) is selected from dimethyl-5-sulfoisophthalate, alkali metal salt or 5-sulfoisophthalic acid, alkali metal salt.

4. The film of claim 1 wherein (C) is selected from aliphatic or aromatic diacids, diols, diamines, diisocyanates or polyols selected from $C_2$–$C_{20}$ alkylene glycol or polyalkylene glycol.

5. The film of claim 1 wherein the functional groups of each-of the monomers (A), (B) and (C) are selected from carboxylic acid, acid ester, acid anhydride, acid halide, isocyano, hydroxyl or amino groups; said groups are present in a molar ratio of carboxylic acid, acid ester, acid anhydride, acid halide and isocyano groups to hydroxyl and amino groups of from 0.9:1 to 1.1:1; and said mer units derived from (B) are present in from 0.25 to 20 molar percent of said codensation polymer.

6. A laminated product comprising a plurality of layers, including
i) at least one layer, the layer comprising an oxygen scavenger composition comprising a condensation polymer and a transition metal salt, compound or complex, wherein said polymer comprises mer units derived from (A) at least one or a mixture of substituted alicyclic compounds having non-aromatic, ethylenic functionality according to the following representation:

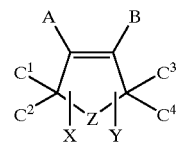

wherein
A, B, $C^1$, $C^2$, $C^3$, $C^4$ each independently represents hydrogen or a $C_qH_{2q+1}$ hydrocarbyl group with q being an integer in the range of from 0 to 20, provided that either A or B and at least one of $C^1$, $C^2$, $C^3$, $C^4$ are hydrogen atoms and each carbon atom of the alicyclic ring is fully substituted by groups selected from hydrogen, hydrocarbyl X or Y groups or mixtures thereof;

X and Y each independently or together represents functional groups that is capable of being part of a heteroatom containing linkage forming a covalent bond linkage between the cycloalkenyl containing group and other monomeric groups forming the condensation polymer; and Z being selected from a —$(C_tH_{2t})$— hydrocarbylene group with t being an integer in the range from 1–4;

(B) at least one or a mixture of substituted non-aromatic or aromatic hydrocarbyl compounds having ionomeric functionality according to the following representation:

wherein
R represents a non-aromatic or aromatic hydrocarbon group;
each F independently or two F groups together represent a functional group capable of being part of a heteroatam containing linkage between the hydrocarbon group R and other monomeric groups forming the condensation polymer;
E represents an anionic group selected from sulfonyl or carboxyl group;
M represents a cationic alkali metal ion or cationic alkaline earth metal ion; and
"a" represents an integer having the value equal to the numerical value of the valence of M; and (C) at least one or a mixture of di- or polyfunctional hydrocarbon compounds according to the following representation:

wherein
R' represents a non-aromatic or aromatic hydrocarbon group; and
each G independently represents a functional group capable of being part of a heteroatom containing linkage between the hydrocarbon group R' and the other monomeric groups forming the condensation polymer, and
x is at least 1; and
ii) at least one layer comprising a material selected from the group consisting of
a) a polymeric article,
b) a paper article, and
c) a metal article.

7. The laminated product of claim 6 wherein (A) comprises a monomer selected from 3-cycohexene-1,1-dimethanol, tetrahydrophthalic acid, dimethyl tetrahydrophthalate, tetrahydrophthalic anhydride, and mixtures thereof.

8. The laminated product of claim 6 wherein (B) is selected from dimethyl-5-sulfoisophthalate, alkali metal salt or 5-sulfoisophthalic acid, alkali metal salt.

9. The laminated product of claim 6 wherein (C) is selected from aliphatic or aromatic diacids, diols, diamines, diisocyanates or polyols selected from $C_2$–$C_{20}$ alkylene glycol or polyalkylene glycol.

10. The laminated product of claim 6 wherein the functional groups of each of the monomers (A), (B) and (C) are selected from carboxylic acid, acid ester, acid anhydride, acid halide, isocyano, hydroxyl or amino groups; said groups are present in a molar ratio of carboxylic acid, acid ester, acid anhydride, acid halide and isocyano groups to hydroxyl and amino groups of from 0.9:1 to 1.1:1; and said mer units derived from (B) are present in from 0.25 to 20 molar percent of said codensation polymer.

11. An oxygen scavenger composition comprising a condensation polymer and a transition metal salt, compound or complex, wherein said polymer comprises mer units derived from (A) at least one or a mixture of substituted alicyclic compounds having non-aromatic, ethylenic functionality according to the following representation:

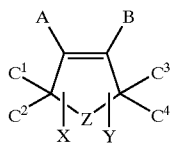

wherein
A, B, $C^1$, $C^2$, $C^3$, $C^4$ each independently represents hydrogen or a $C_qH_{2q+1}$ hydrocarbyl group with q being an integer in the range of from 0 to 20, provided that either A or B and at least one of $C^1$, $C^2$, $C^3$, $C^4$ are hydrogen atoms and each carbon atom of the alicyclic ring is fully substituted by groups selected from hydrogen, hydrocarbyl X or Y groups or mixtures thereof;
X and Y each independently or together represents functional groups that is capable of being part of a heteroatom containing linkage forming a covalent bond linkage between the cycloalkenyl containing group and other monomeric groups forming the condensation polymer; and
Z being selected from a —($C_tH_{2t}$)— hydrocarbylene group with t being an integer in the range from 1–4;

(B) at least one or a mixture of substituted non-aromatic or aromatic hydrocarbyl compounds having ionomeric functionality according to the following representation:

wherein
R represents a non-aromatic or aromatic hydrocarbon group;
each F independently or two F groups together represent a functional group capable of being part of a heteroatam containing linkage between the hydrocarbon group R and other monomeric groups forming the condensation polymer;
E represents an anionic group selected from sulfonyl or carboxyl group;
M represents a cationic alkali metal ion or cationic alkaline earth metal ion; and
"a" represents an integer having the value equal to the numerical value of the valence of M; and (C) at least one or a mixture of di- or polyfunctional hydrocarbon compounds according to the following representation:

$$G-R'(-G)_x$$

wherein
R' represents a non-aromatic or aromatic hydrocarbon group; and
each G independently represents a functional group capable of being part of a heteroatom containing linkage between the hydrocarbon group R' and the other monomeric groups forming the condensation polymer, and
x is at least 1.

12. The composition of claim 11 wherein said condensation polymer comprises from 40 to 60 molar percent (A), from 0.25 to 20 molar percent (B), and from 40 to 60 molar percent (C).

13. The composition of claim 11 wherein functional groups X, Y, F, and G are each independently selected from the group consisting of —$(CH_2)_n$—OH, —$(CH_2)_n$—$NH_2$, —$(CH_2)_n$—N=C=O and —$(CH_2)_n$—C=O)-D with n being an integer in the range from 0 to 20 and D being selected from a halide atom or an OR group wherein R is an —H or $C_1$—$C_{12}$ alkyl group, or X and Y together, two F groups together or two G groups together represent —$((CH_2)_n$—C=O$)_x$-D with n being an integer in the range from 0 to 20, D is oxygen atom and x is 2.

14. The composition of claim 11 wherein (A), (B) and (C) have functional groups such that the molar ratio of hydroxyl and amino functional groups to carboxylic acid, carboxylic acid ester, carboxylic acid halide and isocyano functional groups is from 0.9:1 to 1.1:1.

15. The composition of claim 11 wherein (A) comprises alicyclic units selected from substituted cyclohexene; and Z being —($C_tH_{2t-2}$) with t being 1.

16. The composition of claim 11 wherein (A) comprises a monomer selected from 3-cycohexene-1,1-dimethanol, tetrahydrophthalic acid, dimethyl tetrahydrophthalate, tetrahydrophthalic anhydride, and mixtures thereof.

17. The composition of claim 11 wherein (B) is selected from dimethyl-5-sulfoisophthalate, alkali metal salt or 5-sulfoisophthalic acid, alkali metal salt.

18. The composition of claim 11 wherein (C) is selected from aliphatic or aromatic diacids, diols, diamines, diisocyanates or polyols selected from $C_2$–$C_{20}$ alkylene glycol or polyalkylene glycol.

19. The composition of claim 11 wherein (C) is selected from $C_2$–$C_{20}$ alkylene glycol, $C_4$–$C_8$ alkylene glycol, poly($C_2$–$C_4$ alkylene) glycol, and 3-cyclohexene-1,1-dimethanol.

20. The composition of claim 11 wherein the transition metal salt is selected from the group consisting of cobalt neodecanoate, cobalt 2-ethylhexanoate, cobalt oleate, cobalt acetylacetonate, and cobalt 2-ethylbutyrate.

21. The composition of claim 11 wherein the composition comprises an effective amount of a photoinitiator.

22. The composition of claim 11 wherein the composition comprises a diluent polymer selected from the group consisting of polyester, polyamides, polycarbonates, polyurethanes and polyethers, ethylene polymers or copolymers, acrylate polymers, ethylene-vinyl alcohol copolymer, polypropylene and polypropylene copolymers, styrene polymers and styrene copolymers, vinyl chloride polymer and vinyl chloride copolymers, polyvinylidene polymers and copolymers and mixtures thereof.

* * * * *